United States Patent
Waitkus et al.

[11] 3,712,597
[45] Jan. 23, 1973

[54] GLASS MANUFACTURING SYSTEM

[75] Inventors: Joseph Waitkus, Wellsville, N.Y.; Derek Orem Van Buskirk, Mars, Pa.

[73] Assignee: The Air Preheater Company, Inc., Wellsville, N.Y.

[22] Filed: Nov. 18, 1970

[21] Appl. No.: 90,531

[52] U.S. Cl. ............................263/15 R, 263/20
[51] Int. Cl. .....................F27d 17/00, F23l 15/04
[58] Field of Search......................263/15, 20, 18

[56] References Cited

UNITED STATES PATENTS

| | | | |
|---|---|---|---|
| 2,937,855 | 5/1960 | Hazen | 263/20 |
| 3,223,135 | 12/1965 | Webber | 263/15 R |
| 2,794,631 | 6/1957 | Becker et al. | 263/15 R |

*Primary Examiner*—John J. Camby
*Attorney*—Wayne H. Lang and Eldon H. Luther

[57] ABSTRACT

An arrangement for manufacturing glass at a continuously high temperature that involves a system utilizing a rotary regenerative air preheater in combination with a recuperative heat exchanger of the bayonet type to provide preheated air to a glass tank for combustion therein at a uniformly high temperature and at a constant rate of flow.

6 Claims, 3 Drawing Figures

PATENTED JAN 23 1973 3,712,597

INVENTOR.
Joseph Waitkus
BY Derek O. Van Buskirk

Wayne H. Lang
AGENT

GLASS MANUFACTURING SYSTEM

BACKGROUND OF THE INVENTION

Field of the Invention

This invention relates to an arrangement whereby a tank or melting furnace used in the manufacture of glass may effectively be operated by air flowing at a constant rate and at a constant temperature to improve productivity, fuel economy and the quality of the product while reducing the operating costs and the amount of maintenance required.

Summary of the Invention

The present invention relates to a glass manufacturing system that utilizes a series of bayonet type metallic recuperative heat exchangers in combination with a highly efficient continuous rotary regenerative air preheater to replace the commonly used intermittent ceramic type regenerators or checkers that provide a fluctuating temperature, are expensive to operate and whose use results in an inferior product.

Checker type regenerative heat exchangers comprised of alternately used banks of ceramic materials have long been recognized as the only available arrangement for utilizing the waste heat of glass tanks. Operating at temperatures ranging from 2,200° to 2,600° F. there was no alternative to their use inasmuch as the operating temperature of the glass tanks was in excess of the temperatures tolerated by heat exchangers comprised of commercially available metals arranged in a conventional manner.

The development of thermal resistant alloys, ceramic coatings and the recent design of cantilever supported bayonet type heat exchangers now makes possible the use of metallic heat exchangers in areas of high temperature heretofore deemed untenable.

The regenerative principle of heat exchange followed by conventional ceramic checkerwork heat exchangers of the type commonly used in the manufacture of glass comprises duplicate banks of ceramic blocks over which the hot exhaust gases and combustion air are alternately passed so that heat absorbed from the gases may be given up to the cooler air. Inasmuch as this is basically an intermittent or an interrupted cycle the temperature of air and gas exhausting therefrom alternately varies between the temperatures of the hot exhaust gas and the cool ambient air, and the quantity of air and gas flow varies from maximum to minimum as the valves controlling fluid flow are alternately opened and then closed.

This variable flow rate and cycling temperature ranging from very low to very high results in a poor fuel rate, a low quality product, short refractory life, high maintenance costs and a relatively low quantity of product output. Moreover, variable high temperatures are not readily treated for the removal of particulate matter therein.

Thus, a further and more common reason for the current need for uniformly lower temperature in the exhaust gas is to assist in the control of air pollution. In this connection the air preheater combination defined by this invention reduces the temperature of the waste gas uniformly and sufficiently to accommodate an effective means for the removal of particulate matter and non-particulate pollutants.

This invention proposes an arrangement by which a highly effective continuous rotary regenerative air preheater may be utilized in the low temperature zone while a recuperative heat exchanger of bayonet design and comprised of recently developed temperature resistant materials may be used in the high temperature zone of a glass manufacturing system.

This combination of metallic regenerative and recuperative heat exchangers having a uniform flow and a substantially constant outlet temperature would replace the usually used, intermittent ceramic regenerators in a glass manufacturing system to provide a system with an improved fuel rate that would provide an improved quality and quantity of product at a reduced cost. An additional benefit is that the reduction of waste gas temperature would permit the removal of particulate matter as required for air pollution control.

BRIEF DESCRIPTION OF THE DRAWING

A more complete understanding of our invention is to be realized by referring to the following description which may be reviewed in conjunction with the accompanying drawings in which.

DESCRIPTION OF THE PREFERRED EMBODIMENT

Figure 1:
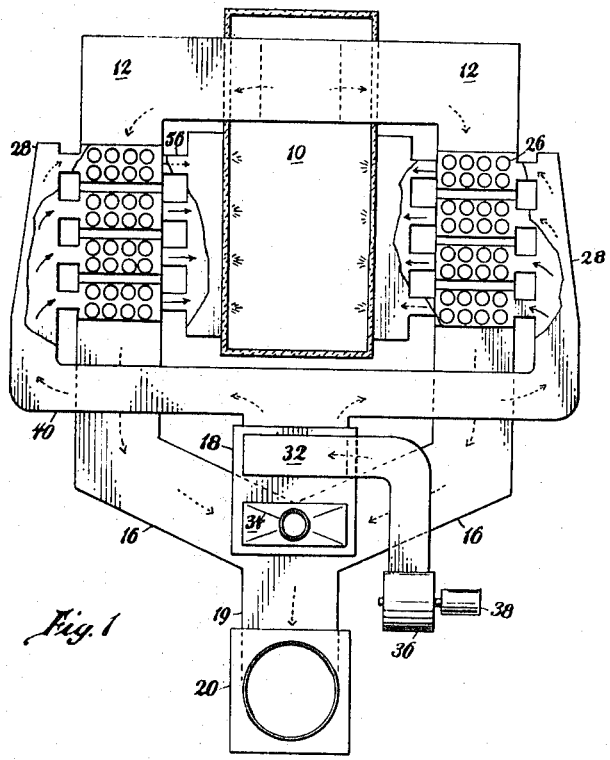
FIG. 1 is a schematic diagram showing a glass tank that utilizes combined recuperative and regenerative heat exchangers to heat the air that is required therefor.

In the drawings of the present invention the reference numeral 10 designates a glass tank or vessel used in the processing of molten glass. Hot exhaust gas being given off from the process is vented from the tank 10 through exhaust ducts 12 at opposite sides thereof which in turn passes through the gas inlet ducts 16 of a rotary regenerative heat exchanger 18. After traversing the heat exchanger 18 and giving up heat to the heat absorbent plates of the heat exchanger, the then cooled gases are exhausted to the atmosphere through an outlet duct 19 leading to a stack 20.

Extending through apertures in a wall or the roof of the exhaust ducts 12 are a series of bayonet type recuperative heat exchangers 26 that abosrb heat from the hot gases exhausting from the glass tank 10. Passing through the flow passageways on the interior of the bayonet type recuperators in heat exchange relation with the hot exhaust gas passing over the outer surface thereof is a stream of cooler combustion air that is received from a manifold 28 that in turn receives the air flowing through the air side 32 of the rotary regenerative heat exchanger 18 in heat exchange with relation to the hot exhaust gases from the glass tank that flow through a spaced duct 34.

By virtue of the fact that the bayonet type heat exchangers 26 are supported from a single plane or cantilevered outward from a single supporting wall of the exhaust duct, the opposite or unsupported end thereof is unencumbered and free to expand and contract without any resistance from adjacent heat exchange structure. Moreover, inasmuch as each unit 26 is a bayonet type heat exchanger with inlet and outlet flow at the supported end, each unit must support only itself so the strength requirements thereof are minimized. Therefore even at temperatures which normally exceed the temperatures at which structural units are to be used, the bayonet type heat exchangers 26 will have sufficient strength.

Still other features that have made possible the use of heat exchangers of this type are the development of materials and the use of manufacturing procedures that may be used at high and extremely high temperatures. Thus the tubes 26 may be comprised of cast tungsten carbide, or they may be cast from a less exotic material and then coated with a temperature resistant ceramic coating.

The air flowing through duct 32 of the rotary regenerative heat exchanger 18 is supplied via duct 40 from a pump 36 driven by a motor 38. Thus cool, ambient air is provided with an initial degree of even preheat on its passage through the rotary regenerative preheater 18 to the high temperature bayonet type heaters 26.

The bayonet type recuperative heat exchangers 26 comprise a series of metal tubes 42 which are open at one end and closed at the other and suspended by flanges 44 at the open end which traverses a wall (preferably the roof) of the hot gas exhaust chamber 12. An inner tube extends downwardly in each tube substantially to the bottom of the outer tube from the flange 44. The top of the outer tubes and inner tubes are enclosed in header boxes 52 and 54 respectively, the inner tube being connected to the air duct 40 via header 28 and the outer tube being connected to duct 56. It is thus apparent that heated air flowing through manifold 28 from rotary regenerative heat exchanger 18 is further heated as it passes through the flow passageways of the recuperators 26 to the ducts 56 and into the glass furnace 10.

A bayonet type recuperative heat exchanger of the type defined herein may operate continuously at high temperatures in excess of 2,000° F., temperatures that were heretofor tolerated only by heat exchangers of ceramic composition.

Figure 2:
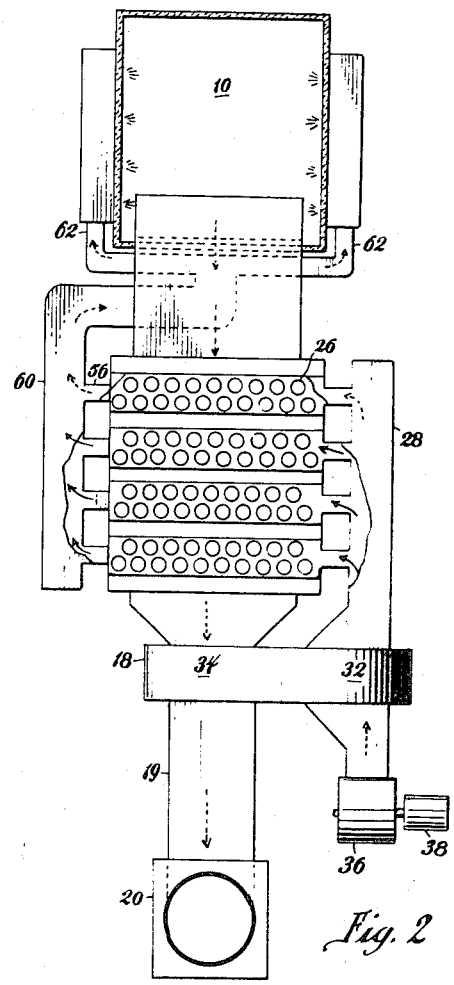
FIG. 2 is a modified glass tank arrangement.
Figure 3:
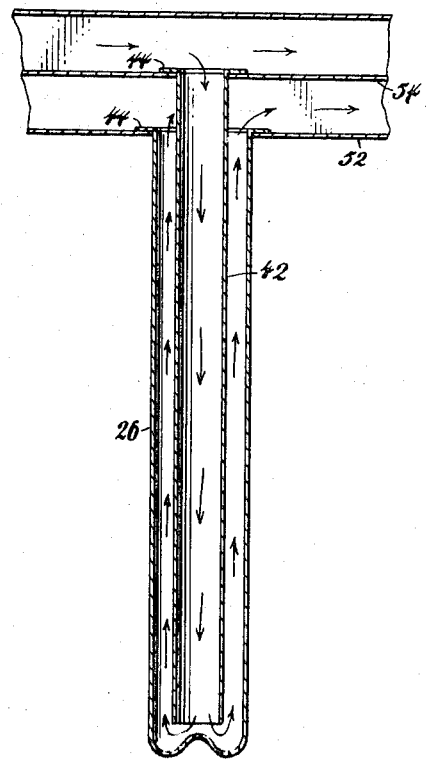
FIG. 3 shows the enlarged details of a bayonet type recuperator used in conjunction with the above defined glass manufacturing system.

In the modification shown in FIG. 2, a single battery of bayonet type recuperators 26 is positioned at one side of the glass tank or furnace and the air in duct 60 that is heated thereby is divided in ducts 62 and then admitted to opposite sides of the glass tank 10.

This and other variations of my glass tank may be made without departing from the spirit of my invention, and it is intended that all matter contained in the above description or shown in the accompanying drawings shall be interpreted as illustrative and not in a limiting way.

We claim:

1. A glass manufacturing system comprising in combination a glass tank, an exhaust duct connected to said tank for directing hot gas away therefrom, an inlet duct connected to said tank for directing combustion air thereto, concentric bayonet type recuperator tubes extending into said exhaust duct having passageways therebetween with inlet and outlet ports on the outside thereof, a rotary regenerative heat exchanger having inlet and outlet ports for hot gas and cooler air, duct means connecting the gas inlet port of the rotary regenerative heat exchanger with the exhaust directing hot exhaust gas away from the glass tank, a hot air duct connecting the air outlet port of the regenerative heat exchanger with the hot air inlet port in the glass tank, the hot air ducts from the regenerative heat exchanger passing serially through inlet and outlet ports of the bayonet recuperator tubes before entering the glass tank whereby combustion air for the glass tank is preheated serially by the regenerative heat exchanger and by the bayonet type recuperative heat exchanger before it is introduced into the glass tank.

2. A glass manufacturing system as defined in claim 1 wherein one end of each bayonet type recuperator tube traverses a single wall of the exhaust duct and is supported thereby to permit unencumbered expansion and contraction of the unsupported end thereof.

3. A glass manufacturing system comprising a glass tank containing a mass of molten glass, exhaust ducts at opposite sides of the glass tank directing hot gases away therefrom, inlet ducts on opposite sides of said tank directing hot combustion air thereto, banks of bayonet type recuperator tubes in each exhaust duct suspended from the roof thereof and having inlet and outlet ports outside said duct, a rotary regenerative heat exchanger having inlet and outlet ports for hot gas and cooler air, duct means connecting the gas inlet port of the rotary regenerative heat exchanger with the exhaust ducts directing hot exhaust gas away from the glass tank, hot air ducts connecting the air outlet port of the regenerative heat exchanger with the air inlet ports at opposite sides of the glass tank, the hot air ducts from said regenerative heat exchanger passing through the bayonet type recuperator tubes and to the glass tank adjacent thereto whereby combustion air to the glass tank is maintained at a substantially constant temperature at the surface of the molten glass.

4. A glass manufacturing system as defined in claim 3 wherein the bayonet type recuperator comprises inner and outer tubes having passageways therebetween for the flow of fluid axially between inlet and outlet ports.

5. A glass manufacturing system as defined in claim 3 wherein the inner bayonet type recuperator tube that projects into the exhaust duct is connected to the rotary regenerator.

6. A glass manufacturing system as defined in claim 3 wherein the passageways between inner and outer tubes of the bayonet type recuperators are connected at an end opposite the inlet and outlet ports to permit the serial flow of fluid between inlet and outlet ports thereof.

* * * * *